Figure 1:
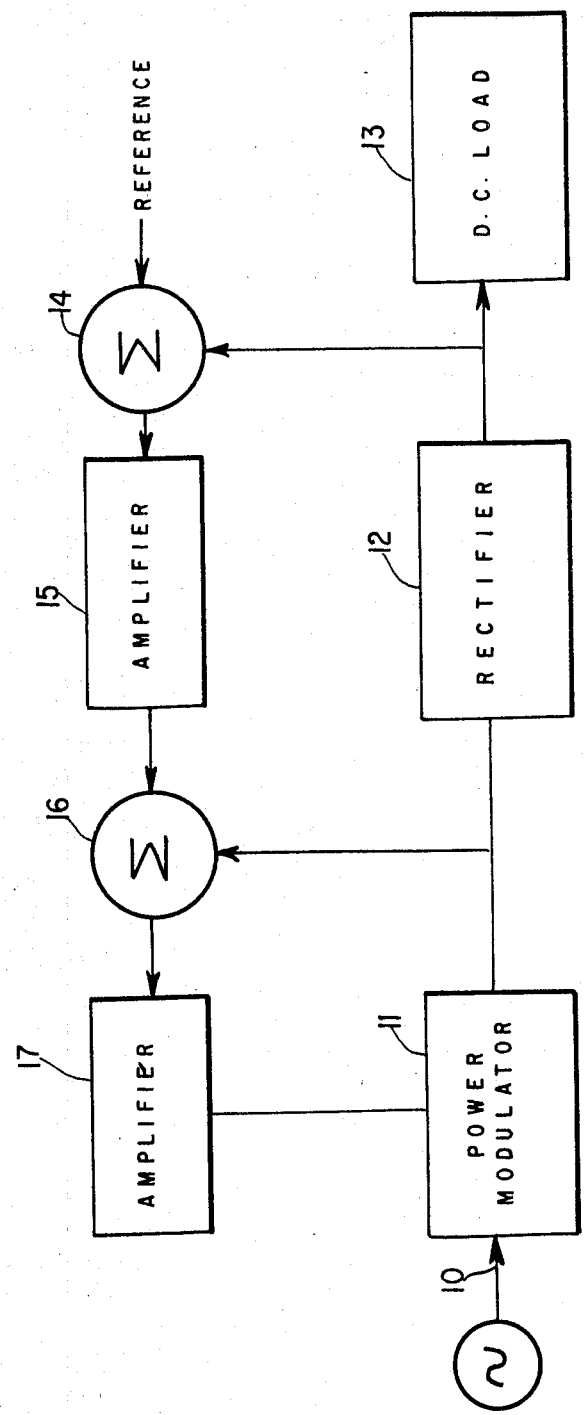

Aug. 16, 1966  J. W. MARTIN  3,267,351
REGULATED D.-C. POWER SUPPLY WITH CONTROLLABLE
POWER MODULATOR
Filed Oct. 8, 1962  2 Sheets-Sheet 2

INVENTOR
JOHN W. MARTIN
BY
Robertson ay Smythe
ATTORNEYS

United States Patent Office 3,267,351
Patented August 16, 1966

3,267,351
REGULATED D.-C. POWER SUPPLY WITH CONTROLLABLE POWER MODULATOR
John W. Martin, Oak Park, Ill., assignor to Basic Products Corporation, Elk Grove Village, Ill., a corporation of Wisconsin
Filed Oct. 8, 1962, Ser. No. 228,852
10 Claims. (Cl. 321—19)

This invention relates to regulated D.C. power supply systems.

It has been found desirable, with relatively large regulated D.C. power supplies in which there is a rectifier, to provide a controllable power modulator therein which is static, has a fast response and which also gives a substantially undistorted waveform. Magnetic amplifiers have not been satisfactory because there is a serious distortion of the A.C. voltage with resultant filtering difficulties, particularly in a single phase type of power supply. A motor driven control, such as a "Variac," preserves the waveform but has a response that is too slow. Similarly, a saturable reactor has a fair waveform but has a slow response.

One of the primary problems in the regulating systems for such a D.C. power supply, wherein rectified A.C. is used and wherein primary regulation is employed, is that the regulating loop must encompass the power filter following the rectifier. This filter usually consists of at least one choke and capacitor in an L or similar circuit. Several stages may be employed if the waveform is severely distorted by the power modulator and if the ripple level has to be very low. The time delay in such filters when introduced into an overall feedback loop, where the output is sensed and primary regulation is used, makes it very difficult to have sufficiently high gain to make the regulation close enough to meet specific, stringent requirements of many D.C. supplies. This is particularly the case where there may be line voltage variations.

One of the objects of the invention is to provide a regulated D.C. power supply which has static parts and which will provide fast response to changes in the line and load.

In one aspect of the invention, an A.C. power supply is connected to a power modulator. Preferably, the power modulator is one which has means to shift the flux in response to D.C. control applied thereto. Such may be termed a "flux valve" power modulator, as will be described hereafter. A rectifier is connected to the output of the modulator, the rectifier in turn being connected to the D.C. output or load terminals through a filter and load current sensing means. An output comparing and amplifying or summation means receives a signal from the output D.C. and compares it with a reference signal.

In a preferred form, the signal from the output current transducer or sensing means also can be fed to the output voltage comparing and sensing means. A second comparing and amplifying or summation means receives the variable signal from the output voltage summation circuit and compares it with the output from the power modulator. A unijunction transistor can be used to receive the signal from the second summation circuit and control a silicon controlled rectifier means which supplies D.C. to the control windings of the power modulator. Thus, an inner and outer loop is used so that the output of the power modulator is regulated almost independently of the overall main loop. As a result, the gain requirement of the main loop is reduced and it is possible to achieve closer regulation than is the case with a single loop. If a single loop is used, the output D.C. signal can be compared with the reference signal and fed to the unijunction transistor for controlling the modulator.

These and other objects, advantages and features of the invention will become apparent from the following description and drawings which are merely exemplary.

In the drawings:
FIG. 1 is a schematic block diagram; and
FIG. 2 is a schematic wiring diagram.

Referring to the block diagram of FIG. 1, a source of A.C. power is connected at 10 to a power modulator 11 which will be described hereafter. The A.C. output of the modulator 11 is fed to rectifier means 12 from which rectified D.C. is fed to the D.C. load 13. A D.C. output signal is fed to an output voltage summation device 14 which also has a reference voltage supplied thereto. The output from summation device 14 is fed through amplifier 15 to a second summation device 16. An output signal from the power modulator 11 also is fed to the summation device 16. The signal from the summation device 16 is fed through amplifier 17 which in turn is connected to the control winding control or means of the power modulator 11.

Figure 2:
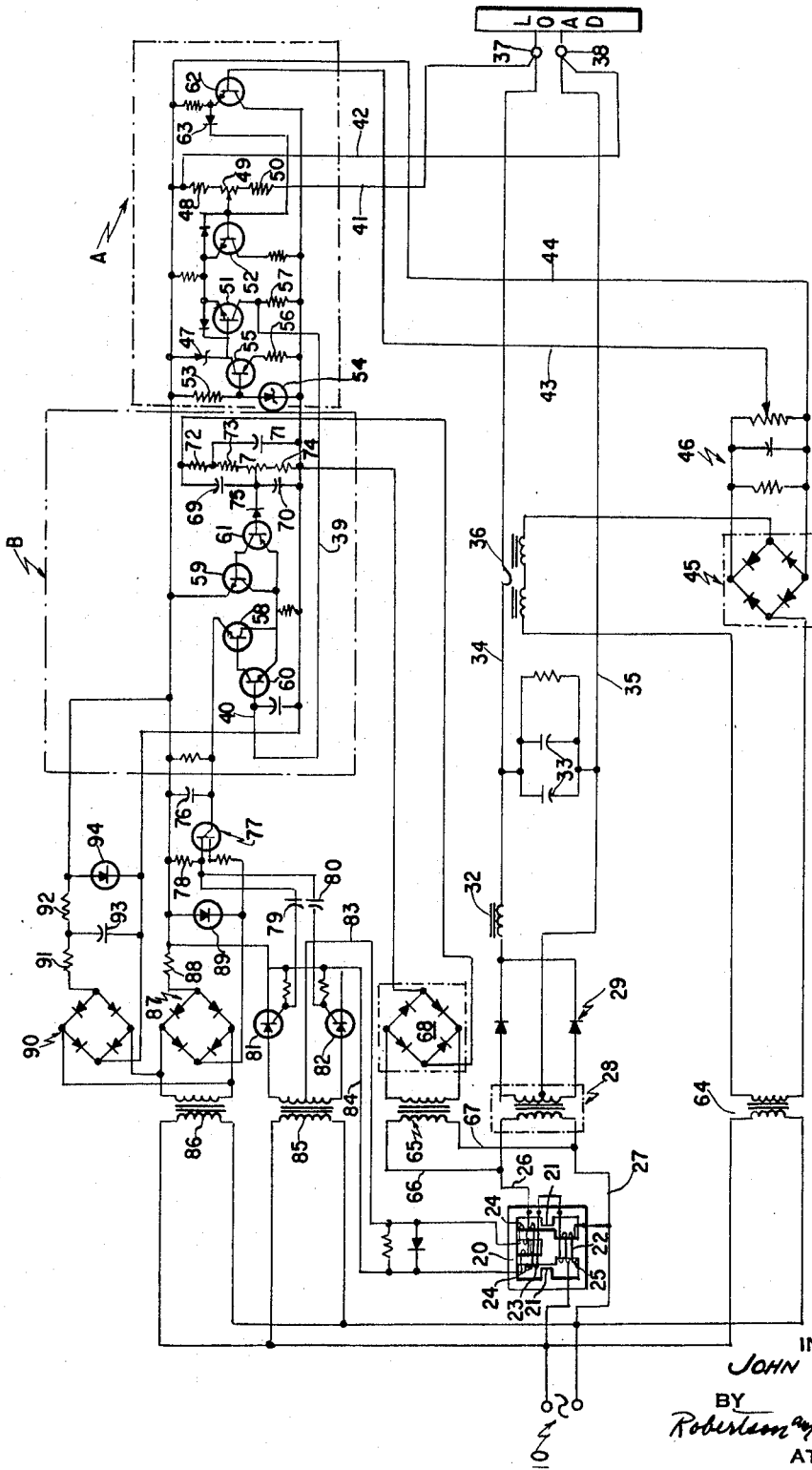

Referring now to FIG. 2, a specific circuit is shown for carrying out the invention employing an inner and outer loop wherein A.C. input 10 feeds the D.C. controlled A.C. power modulator 11.

The power modulator illustrated may be referred to as a "flux valve" type, the details of which are described in copending application Serial No. 114,079, filed June 1, 1961, now U.S. Patent No. 3,172,031, such being a high leakage reactance transformer having a core 20 with a magnetic shunt path, there being an air gap or gaps 21 therein. Primary 22 is on one side of the gap and the secondary 23 is on the other side of gap 21. The D.C. control windings 24 are located on the core so that a change in D.C. will shift the flux from the secondary to the shunt path so as to control the secondary output. In the particular modulator shown, the primary is in the form of an autotransformer so that more voltage is available across the primary due to extension 25. The secondary 23 has one of its ends connected to the primary extension and the other end connected to the lead 26, the primary having its opposite end connected to lead 27. The secondary may be arranged in bucking relation so that increase in D.C. will result in an increase of the modulator output voltage and vice versa. It is to be understood that other forms and arrangements of the power modulator and core can be used. Also, if desired, two or more modulators can be connected in parallel.

Rectifier transformer 28 is connected to leads 26, 27, the full wave rectifier means 29 being connected to the output of rectifier transformer 28. A filter network including choke 32 and capacitor means 33 is connected to the output of the rectifier 29. The D.C. power then flows through leads 34, 35 and through overcurrent detector or transductor 36 to output terminals 37, 38.

Within box A is a control network, the output of which appears on lead 39 as a variable reference for the control network in block B, such being fed thereto at point 40. Control network A receives two input signals, one through leads 41, 42 proportional to the D.C. output appearing across output terminals 37, 38, and one through leads 43, 44 proportional to the output current as obtained from overcurrent transductor 36, rectifier bridge 45 and filter network 46.

The output voltage signal from leads 41, 42 is compared with a reference voltage developed across Zener diode 47. Such is accomplished by taking part of the D.C. output from divider network including resistance 48, potentiometer 49, resistance 50, and feeding it to one side of differential amplifier including transistors 51, 52 and comparing it to the reference voltage across Zener diode 47.

The current through Zener diode 47 is regulated by a constant current source composed of resistor 53, Zener diode 54, transistor 55 and resistor 56. The output of the differential appearing across resistance 57 is connected by lead 39 to point 40 where it is fed into the complementary paired differential amplifier including transistors 58, 59, 60 and 61. It is compared in the complementary paired differential amplifier or summation circuit to the reference signal obtained from the A.C. regulator output, such being included in the summation circuit corresponding to block 16 in FIG. 1, as will be explained hereafter.

Transistor 62 amplifies the signal received on lines 43, 44 which is proportional to load current from network 46, transistor 62 injecting a signal into the differential transistor amplifier network 51, 52, so as to influence the variable reference voltage delivered by lead 39 to point 40 of the complementary paired differential amplifier.

Describing the overcurrent circuit in more detail, transformer 64 feeds the rectifier bridge 45 through transductor 36. When the overcurrent signal becomes large, diode 63 becomes forward biased and controls the base of transistor 52 in order to drop the output voltage. Such provides the proper characteristic for paralleling two supplies in a safe manner because when one unit reaches full load, its output voltage declines which will force the other unit to pick up the load.

A signal is derived from the output of the power modulator through leads 66, 67 and transformer 65 from the output of the power modulator 11, such being a signal proportional to the primary voltage of the rectifier transformer 28. The rectifier bridge 68 feeds the rectified D.C. signal into a network including capacitor 69, capacitor 70, capacitor 71, resistors 72, 73, 74, and potentiometer 75. The output of the differential signal through transistor 58 supplies a current to charge capacitor 76.

When a sufficiently high voltage level is reached on capacitor 76, unijunction transistor 77 fires and capacitor 76 will discharge through unijunction transistor 77 and resistor 78. This produces a signal pulse through capacitors 79 and 80 which controls the firing angle of silicon controlled rectifiers 81, 82. Firing of the silicon rectifiers 81, 82 will supply a controlled D.C. through lines 83, 84 to the D.C. control windings 24, 24 of power modulator 11. Thus, the control current supply to the power modulator 11 will regulate the A.C. output to transformer 28 and thereby the D.C. supply at terminals 37, 38. Transformer 85 furnishes power for the silicon controlled rectifiers 81, 82 and related network.

Transformer 86 feeds rectifier bridge 87 which provides a full wave unfiltered supply through resistor 88 and Zener diode 89, with the peaks clamped to the Zener voltage of Zener diode 89 for operation of the unijunction transistor 77.

During each half cycle, the voltage of unijunction transistor 77 returns to zero. When the base one to base two voltage of the unijunction transistor 77 becomes low, capacitor 76 will cause unijunction transistor 77 to fire so that capacitor 76 discharges. When the voltage again arises on transistor 77, it will not fire until capacitor 76 recharges to the firing level and again causes firing of unijunction transistor 77. Such will act as a synchronizing pulse to start charging of capacitor 76 on the half cycle zero point. The first firing pulse from transistor 77 during a half cycle will fire silicon controlled rectifiers 81, 82, such being properly synchronized as just described.

Bridge rectifier 90 together with resistance 91, resistance 92, capacitor 93 and Zener diode 94 provides a filtered regulated power supply for the control amplifier.

It is to be understood that variations may be made in details of the arrangement without departing from the spirit of the invention except as defined in the appended claims.

What is claimed is:

1. In a D.C. power supply, the combination including an A.C. power source, an A.C. power modulator connected to said source, rectifier means connected to said power modulator, power modulator output sensing means, D.C. output sensing means connected to the output of said rectifier means, output voltage comparing and amplifying means connected to said output sensing means and to a reference source to provide a variable reference signal, second comparing and amplifying means connected to said power modulator output sensing means and to said output voltage comparing and amplifying means to provide control power, and means connecting said second comparing and amplifying means to said power modulator, so that the output of the power supply is regulated in a predetermined manner for voltage and load changes.

2. In a D.C. power supply, the combination including an A.C. power source, an A.C. flux valve power modulator connected to said source and having D.C. control windings, rectifier means connected to said power modulator, power modulator output sensing means, D.C. output sensing means connected to the output of said rectifier means, output voltage comparing and amplifying means connected to said output sensing means and to a reference source to provide a variable reference signal, second comparing and amplifying means connected to said power modulator output sensing means and to said output voltage comparing and amplifying means to provide control power, and means connecting said second comparing and amplifying means to the D.C. control windings of said power modulator, so that the output of the power supply is regulated in a predetermined manner for voltage and load changes.

3. In a D.C. power supply, the combination including an A.C. power source, an A.C. power modulator connected to said source, said power modulator having a control circuit for controlling its output, rectifier transformer means connected to said power modulator, rectifier means connected to said rectifier transformer means, filter means connected to said rectifier means, power modulator output sensing means, D.C. output sensing means connected to the output of said filter means, output voltage comparing and amplifying means connected to said D.C. output sensing means and to a reference source to provide a variable reference signal, second comparing and amplifying means connected to said power modulator output sensing means and to said output voltage comparing and amplifying means to provide control power, and means connecting said second comparing and amplifying means to the control circuit of said power modulator, so that the output of the power supply is regulated in a predetermined manner for voltage and load changes.

4. In a D.C. power supply, the combination including an A.C. power source, an A.C. power modulator connected to said source, rectifier means connected to said power modulator, filter means connected to the output of said rectifier means, power modulator output sensing means, D.C. output sensing means connected to the output of said rectifier means, output voltage comparing and amplifying means connected to said output sensing means and to a reference source to provide a variable reference signal, second comparing and amplifying means connected to said power modulator output sensing means and to said output voltage comparing and amplifying means to provide control power, and means connecting said second comparing and amplifying means to said power modulator, so that the output of the power supply is regulated in a predetermined manner for voltage and load changes.

5. In a D.C. power supply, the combination including an A.C. power source, an A.C. power modulator including D.C. control windings, rectifier means connected to the output of said power modulator, power modulator output sensing means, D.C. output sensing means connected to the output of said rectifier means, output voltage comparing and amplifying means connected to said output sensing means and to a reference source to provide a first variable feedback control signal, second comparing and amplifying means connected to said power modulator output sensing means and to said output voltage comparing and amplifying means to provide a second variable feedback control signal as a combined function of said first signal and the output of said power modulator, unijunction transistor means having a control terminal connected to said second comparing and amplifying means for being responsive to said second signal, silicon controlled rectifier means having control terminal means connected to the output of said unijunction transistor means, and means connecting said silicon controlled rectifier means from said D.C. source to the control windings of said power modulator, so that the output of the power supply is regulated in a predetermined manner for voltage and load changes.

6. In a D.C. power supply, the combination including an A.C. power source, an A.C. power modulator having D.C. control winding means connected to said source, rectifier means connected to the output of said power modulator, power modulator output sensing means, output voltage comparing and amplifying means connected to a reference source, output load sensing means connected to the output of said rectifier means, connections from said output load sensing means to said output voltage comparing and amplifying means, second comparing and amplifying means connected to said power modulator output sensing means and to said output voltage comparing and amplifying means, and means connecting said second comparing and amplifying means to said power modulator, so that the output of the power supply is regulated in a predetermined manner for voltage and load changes.

7. In a D.C. power supply, the combination including an A.C. power source, an A.C. power modulator connected to said source, rectifier means connected to said power modulator, power modulator output sensing means, D.C. output sensing means connected to the output of said rectifier means, output voltage comparing and amplifying means connected to said output sensing means and to a reference source to provide a variable reference signal, means to adjust the output sensing means so as to adjust the signal fed thereby to the output voltage comparing and sensing means and thereby adjust the output power supply, second comparing and amplifying means connected to said power modulator output sensing means and to said output voltage comparing and amplifying means to provide control power, and means connecting said second comparing and amplifying means to said power modulator, so that the output of the power supply is regulated in a predetermined manner for voltage and load changes.

8. In a D.C. power supply, the combination including an A.C. power source, an A.C. power modulator connected to said source, rectifier means connected to said power modulator, filter means connected to the output of said rectifier means, power modulator output sensing means, D.C. output sensing means connected to the output of said filter means, output voltage comparing and amplifying means connected to said output sensing means and to a reference source to provide a variable reference signal, means to adjust the output sensing means so as to adjust the signal fed thereby to the output voltage comparing and sensing means and thereby adjust the output power supply, second comparing and amplifying means connected to said power modulator output sensing means and to said output voltage comparing and amplifying means to provide control power, and means connecting said second comparing and amplifying means to said power modulator, so that the output of the power supply is regulated in a predetermined manner for voltage and load changes.

9. In a D.C. power supply, the combination including an A.C. power source, an A.C. flux valve power modulator connected to said source, said modulator having a high leakage reactance core with at least one magnetic shunt path, primary winding means on said core on one side of said shunt path, secondary winding means on said core having at least a portion thereof on the other side of said shunt path, D.C. control windings on said core for shifting flux from said secondary winding means to said shunt path, rectifier means connected to said power modulator, power modulator output sensing means, D.C. output sensing means connected to the output of said rectifier means, output voltage comparing and amplifying means connected to said output sensing means and to a reference source to provide a variable reference signal, second comparing and amplifying means connected to said power modulator output sensing means and to said output voltage comparing and amplifying means to provide control power, and means connecting said second comparing and amplifying means to said power modulator, so that the output of the power supply is regulated in a predetermined manner for voltage and load changes.

10. In a D.C. power supply, the combination including an A.C. power source, an A.C. power modulator connected to said source, said modulator having a high leakage reactance core with at least one magnetic shunt path, primary winding means on said core on one side of said shunt path, secondary winding means on said core having at least a portion thereof on the other side of said shunt path, D.C. control windings on said core for shifting flux from said secondary winding means to said shunt path, rectifier means connected to said power modulator, filter means connected to the output of said rectifier means, power modulator output sensing means, D.C. output sensing means connected to the output of said rectifier means, output voltage comparing and amplifying means connected to said output sensing means and to a reference source to provide a variable reference signal, means to adjust the output sensing means so as to adjust the signal fed thereby to the output voltage comparing and sensing means and thereby adjust the output power supply, second comparing and amplifying means connected to said power modulator output sensing means and to said output voltage comparing and amplifying means to provide control power, and means connecting said second comparing and amplifying means to said power modulator, so that the output of the power supply is regulated in a predetermined manner for voltage and load changes.

References Cited by the Examiner

UNITED STATES PATENTS

| | | | |
|---|---|---|---|
| 2,987,664 | 6/1961 | Poirier et al. | 321—18 |
| 3,037,159 | 5/1962 | Brown | 321—18 |
| 3,087,107 | 4/1963 | Hunter et al. | 321—25 |
| 3,098,193 | 7/1963 | Wallace et al. | 323—89 |
| 3,122,694 | 2/1964 | Muchnick et al. | 321—25 |
| 3,129,380 | 4/1964 | Lichowsky | 323—89 |

JOHN F. COUCH, *Primary Examiner.*

LLOYD McCOLLUM, *Examiner.*

J. M. THOMSON, M. L. WACHTELL,
*Assistant Examiners.*

UNITED STATES PATENT OFFICE
CERTIFICATE OF CORRECTION

Patent No. 3,267,351                      August 16, 1966

John W. Martin

It is hereby certified that error appears in the above numbered patent requiring correction and that the said Letters Patent should read as corrected below.

Column 1, line 53, for "transducer" read -- transductor --; column 5, line 9, for "D.C." read -- A.C. --.

Signed and sealed this 22nd day of August 1967.

(SEAL)
Attest:

ERNEST W. SWIDER                      EDWARD J. BRENNER
Attesting Officer                      Commissioner of Patents